United States Patent

[11] 3,542,203

[72] Inventors Robert D. Hancock;
Donald T. Bray, Escondido, California
[21] Appl. No. 663,998
[22] Filed Aug. 29, 1967
[45] Patented Nov. 24, 1970
[73] Assignee Desalination Systems, Inc.
a corporation of California. by mesne assignment

[54] SPIRAL REVERSE OSMOSIS DEVICE
3 Claims, 8 Drawing Figs.
[52] U.S. Cl............................................. 210/321,
210/433, 210/441, 210/453, 210/487, 210/494
[51] Int. Cl....................................................... B01d 31/00
[50] Field of Search............................................. 210/321,
494, 444, 433, 487, 453, 441, 442, 437; 55/16, 158

[56] References Cited
UNITED STATES PATENTS
2,185,281 1/1940 Tear............................. 210/494X
3,333,706 8/1967 Isreeli.......................... 210/321
3,367,505 2/1968 Bray............................ 210/321
3,397,790 8/1968 Newby et al................... 210/321

3,400,825 9/1968 Shippey....................... 210/321
2,870,914 1/1959 Bloch.......................... 210/453
FOREIGN PATENTS
972,166 10/1964 Great Britain................ 55/16
OTHER REFERENCES
Osburn et al., "New Diffusion Cell Design" from I & EC, Vol. 46, No. 4, April, 1954, pp 739— 742 relied on.
Willits et al., " Concentration by REVERSE osmosis of Maple Sap" , from FOOD TECHNOLOGY, Jan., 1967, Vol. 21, No. 1, pp. 24— 26 relied on.

Primary Examiner—Reuben Friedman
Assistant Examiner—Frank A. Spear, Jr.
Attorney—Thomas D. Lane ABSTRACT: Water purification device having a reverse osmosis spiral membrane module with a projecting product water outlet tube. The module is disposed within a container comprising a tubular casing having an openable end formed by a plug detachably secured thereto in pressure-tight relationship, the container being provided with a feed water inlet and outlet and having an aperture through which the module outlet tube projects. An annular gasket is seated within the aperture to effect a seal with the outlet tube so that upon separation of the casing and plug the module can be easily removed.

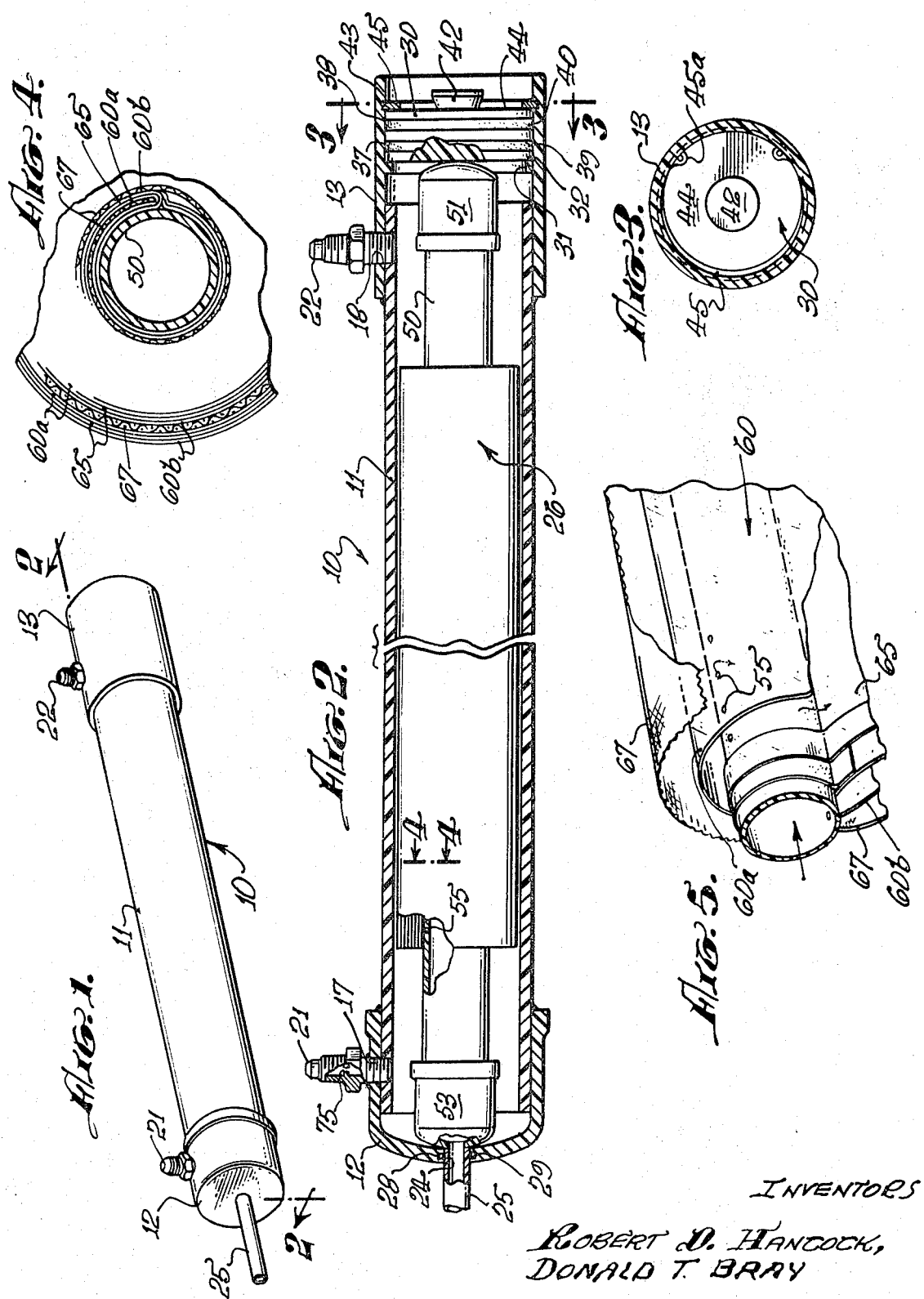

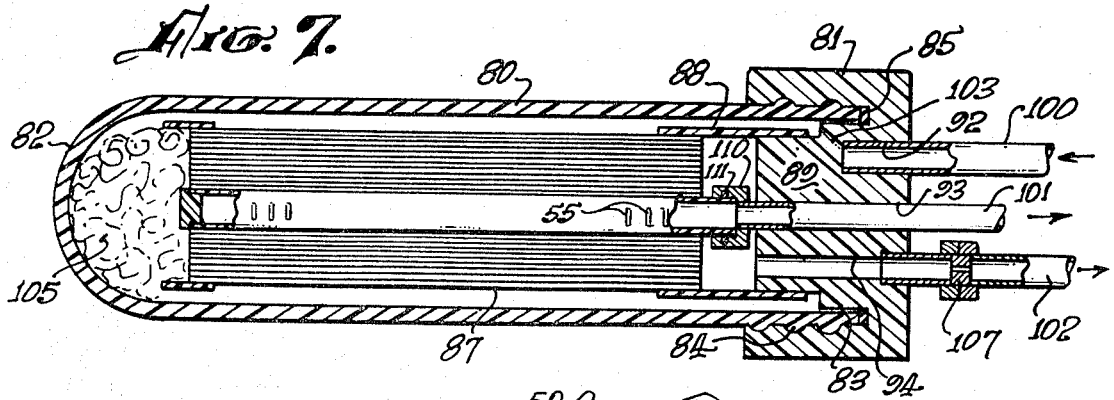
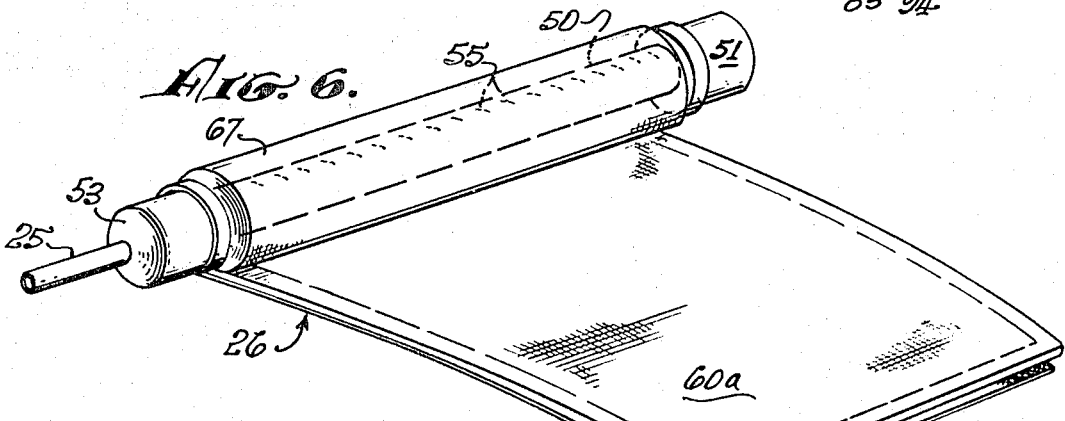
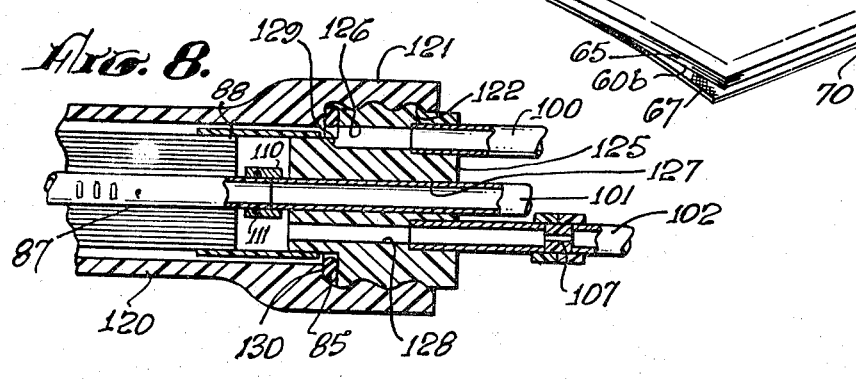
INVENTORS
ROBERT D. HANCOCK,
DONALD T. BRAY
BY HIS ATTORNEYS
Spensley & Horn

SPIRAL REVERSE OSMOSIS DEVICE

There has long been desired a compact and inexpensive water-purifying system for household use, a device to provide fresh water from sea water. Such devices have become practical with the advent of reverse osmosis membranes.

The reverse osmosis process is characterized by the use of pressure in excess of osmotic pressure to force fresh water through a selective membrane capable of rejecting dissolved salts. The process name is derived from the phenomenon whereby water under an applied pressure-driving force flows in an opposite direction to that normally observed in an osmotic experiment where the driving force is the concentration gradient.

The present invention is directed toward a compact and inexpensive water purification device using a reverse osmosis spiral membrane module, this type of module being now well known in the art and shown and described on pages 42 and 43 of the 1964 Saline Water Conversion Report of the United States Department of Interior, Office of Saline Water, and shown on pages 197 and 198 of the U.S. Government 1965 publication entitled Saline Water Conversion, comprising a record of the Senate hearings on May 18 and 19, 1965, on Bill S.24 before the Subcommittee On Irrigation And Reclamation of the Committee On Interior And Insular Affairs. This type of reverse osmosis module is based on a ported tube having spirally would thereon two selective membranes separated by a granular sheet. A screen separator is wound with the membranes to separate the layers of membrane formed by the spiral winding. The present invention is specifically directed toward a housing for a reverse osmosis spiral membrane module, with the housing being in the form of a tubular pressure container which is easily separable for removal and replacement of the module.

Accordingly, it is an object of the present invention to provide an improved water purification device.

It is another object of the present invention to provide a water purification device having a reverse osmosis spiral membrane module.

It is a further object of the present invention to provide a device of the character described which is compact and inexpensive.

It is also an object of the present invention to provide a device of the character described which is capable of quick disassembly for removal of the module.

The novel features which are believed to be characteristic of the present invention, together with further objects and advantages thereof, will be better understood from the following description in which the invention is illustrated by way of example. It is to be expressly understood, however, that the description is for the purpose of illustration only and that the true spirit and scope of the invention is defined by the accompanying claims.

In the drawing:

FIG. 1 is a perspective view of a device made in accordance with the invention;

FIG. 2 is a view taken along line 2–2 of FIG. 1;

FIG. 3 is a view taken along line 3–3 of FIG. 2;

FIG. 4 is a fragmentary view taken along line 4–4 of FIG. 2;

FIG. 5 is a partial perspective view indicating the relationship of the membrane sheets in a typical reverse osmosis spiral membrane module;

FIG. 6 is a perspective view of the reverse osmosis module used in the device of FIGS. 1 and 2, showing the membrane sheets partially unwound;

FIG. 7 is a longitudinal cross-sectional view of an alternative embodiment of a device constructed in accordance with the invention; and FIG. 8 is a partial sectional view of a further embodiment of a device constructed in accordance with the invention.

Since the device described herein incorporates a mechanism which operates by reverse osmosis, a brief explanation of such osmosis is helpful and desirable. If a saline solution is separated from pure water by a semipermeable membrane (one which permits the passage of water but prevents the passage of salt), pure water will flow spontaneously into the saline solution with the necessary driving force being provided by the difference in salt concentration between the two solutions. This flow will continue until an equilibrium is established. That is, until the hydrostatic pressure on the salt solution is just sufficient to prevent the further flow of pure water into the saline water chamber. The movement of pure water into the saline water is called osmosis, and the pressure at which the flow of pure water ceases is known as the equilibrium osmotic pressure of the saline solution.

The normal process of osmosis can be reversed if sufficient pressure is applied to the saline solution to overcome the osmotic pressure. Application of a pressure in excess of the osmotic pressure will cause pure water to flow out of the saline solution in a direction opposite to the osmotic flow, hence the term "reverse osmosis." The driving potential in this reverse case is pressure while in normal osmosis, the driving potential is the difference in salt concentrations between the two solutions.

Referring now to the drawing, there is shown in FIG. 1 one preferred embodiment of a device constructed in accordance with the invention. The housing is denoted generally by the numeral 10. The housing comprises a central cylindrical tubular section 11, capped at its ends by an outlet cap 12 and an inlet cap 13. The terms "inlet" and "outlet" as applied to caps 12 and 13 are used for convenience only to distinguish the caps 12 and 13. It will be clear from the discussion hereinafter that either end of the device may be utilized for inlet or outlet purposes. The section 11 and 12 and 13 may be made of a multitude of materials. However, for economy, in the preferred embodiment shown in FIG. 1, plastic such as polyvinylchloride (more commonly known as PVC) is utilized as the housing material. The inside diameter of section 11 may be of any convenient measurement and will have a predetermined size to accommodate the desired capacity of the device as will be described hereinafter. Also, the length of section 11 may be of any convenient size and will be predetermined according to capacity desired. In experiments with devices as shown in FIG. 1, the inventor has found that diameters in the range of 2 inches to 6 inches and lengths in the range of 12 inches to 60 inches are quite practicable for an efficient and compact unit. The inside diameters of caps 12 and 13 are substantially equal to but greater than the outside diameter of section 11. Thus, for installation the caps 12 and 13 are press fitted onto section 11, as shown best in FIG. 2, and cemented in place by applying glue to the surface contact parts prior to assemblage. Openings 17 and 18 are radially threaded through section 11 and the caps 12 and 13. The openings 17 and 18 are adapted to receive an outlet pipe fitting 21 and an inlet pipe fitting 22 which provide the inlet and outlet means for the unpurified water as will be described hereinafter. The pipe fittings 21 and 22 are threaded into openings 17 and 18 and secured in place. Alternatively, the pipe fittings can be inserted into unthreaded openings properly sized and cemented into place without adverse consequences. Also, fittings other than pipe fittings may be utilized, depending on the desired installation.

Outlet cap 12 has provided therein a central opening 24 to accommodate the product water line tube 25 of the osmosis module 26. The opening 24 is substantially equal to but greater than the diameter of the tube 25 so that tube 25 can be press fitted through opening 24 to create an almost sealed condition. To provide a positive seal, as can be best seen in FIG. 2, groove 28 is formed in opening 24 and an O-ring 29 inserted in groove 28. The O-ring 29 is compressed against tube 25 and forms a seal therewith. The shape of the cap 12 is not critical, and the generally rounded shape shown was chosen for its availability and its safety in handling because of the absence of sharp edges.

The inlet cap 13 is adapted to receive a plug 30 detachably secured thereto and which forms an openable end of the pressure container or housing 10. The cap 13 is a section of cylindrical tubing which extends beyond the end of section 11 of the housing 10. One conventional type of tubing is the standard slip fit coupling for the size of pipe used for section 11. Another convenient approach is to utilize a standard reducing tee where the reducing tee takes the place of opening 18. A smaller diameter section 31 can be formed in cap 13 to provide a circumferential shoulder 32 to limit the depth of insertion of section 11 into cap 13 during the press fit assembly.

The osmosis module 26 is retained between the cap 12 and the plug 30. Plug 30 has a diameter substantially equal to but less than the inside diameter of cap 13 so that the plug 30 may be easily fitted into cap 13. Two circumferential grooves 37 and 38 are defined in plug 30. O-rings 39 and 40 are contained in grooves 37 and 38 to provide a good seal between plug 30 and the inside surface of cap 13. A handle 42 is provided on plug 30 for ease of installation and removal of the plug 30 from cap 13. As an alternative to handle 42 a hole can be drilled part way through plug 30 at its center, this hole being threaded with a convenient machine thread. For removal of the plug 30, a standard threaded eyebolt is screwed into the hole and used as a handle.

A circumferential groove 43 is defined in the inner surface of cap 13. The groove 43 is adapted to receive a snap ring 45. The groove 43 must be located so that the plug 30 can be inserted between the groove 43 and the end of the module 26. The snap ring 45 is of a conventional type, and when installed in groove 43 retains the plug 30 in cap 13 when pressure is applied to the water inside the housing 10. Snap ring 45 has enlarged ends 45a which are adapted for tool insertion to engage and remove ring 45 from its groove 43. Thus, it is a simple matter to remove the ring 45 and the plug 30 to allow replacement of the reverse osmosis module 26. For units which are intended for more or less continuous use, this replacement feature provides for substantial economic savings compared to a unit which is permanently sealed.

Turning now to the reverse osmosis module 26, as can best be seen in FIGS. 2, 5 and 6. Module 26 has as its supporting structure a central product water tube 50. The term "product water" is used for convenience, since, as will be described hereinafter, the purified water will pass through this tube 50 to the outlet tube 25. The tube 50 may be made of any rigid corrosion-resistant material. In the preferred embodiment, the tube 50 is made of plastic such as PVC. Tube 50 is sealed at one end by a cap 51. The cap 51 is also made of plastic and is press-fitted over the end of tube 50 and cemented to form a good seal. A special outlet cap 53 is similarly press-fitted and cemented at the other end of tube 50. The cap 53 has an integrally formed tube section 25 which, as described hereinabove, projects through cap 12. The tube 25 is the water product outlet, that is, the purified water exits through tube 25. A series of ports or apertures 55, as can be readily seen in FIG. 5, are drilled or otherwise formed along the central section of tube 50. Attached longitudinally to tube 50 is a sheet 60 defining two sections 60a and 60b which are semipermeable or reverse osmosis membranes. The two sheet sections are formed by taking a single long sheet and wrapping it around the tube 50 and extending the ends out to form two sheet sections 60a and 60b. The sheet sections are arranged so that the product water side surfaces of membrane sheet 60 face each other. Extending between the reverse osmosis sheet sections 60a and 60b is a sheet 65 of granular material. In the preferred embodiment, the granular sheet 65 comprises a base of sheet material with glass beads affixed thereto. An adhesive is placed on the granular sheet 65 all around the edges and around the central tube. The adhesive penetrates and fills the pores of granular sheet 65 and contacts the product water side of membrane sheet 60, effecting a seal between membrane sheet 60 and the granular sheet 65, and between both to the central tube 50. Thus, as can be readily seen, ports 55 communicate only with product water. That is, because of the fold-over construction of the membranes, as discussed hereinabove, the unpurified water is separated from the granular sheet 65 by the membrane sheet 60. Accordingly, only water that has passed through membrane 60, i.e., product water, can reached ports 55.

Also attached longitudinally to the tube 50 is a plastic screen 67 which is an outside layer when the combined sheets are spirally wound around the tube 50, the screen 67 serving to space apart the layer of windings. The sheets 60, 65 and 67 are spirally wound around the tube 50 to form a compact module. The length of the sheets and the diameter of the module are determined by the desired capacity of the module.

In the completed module, several cylindrical layers are formed as a result of the spiral winding. Each cylindrical layer provides a double membrane facing the granular sheet 65. The plastic screen 67 keeps the individual cylindrical layers separated. The completed winding is kept intact by wrapping the outer part of the roll. In the preferred embodiment, a strip of plastic adhesive tape 70 is utilized. A more detailed explanation of the construction and operation of such reverse osmosis modules can be found in the 1965 Saline Water Conversion Report of the U.S. Department of Interior, Office of Saline Water.

Installed within fitting 21 in the illustrated embodiment is an orifice 75 to reduce the pressure of the unpurified water to atmospheric pressure. The orifice is of conventional design and is sized to provide the desired flow of outlet water. The pressure drop within the housing 10 before the orifice is small, preferably in the range of 0.5 to 1.0 p.s.i. The lower the pressure drop before the orifice, the more efficient the unit since more pressure is available to drive the unpurified water through the membrane 60. In practice, however, a loss of 0.5 to 1.0 p.s.i. is not critical since system operating pressures are generally above 30 p.s.i.

In operation of the unit, the unpurified water, which may be sea water or other brackish water, enters at fitting 22 and exits at fitting 21. The pressure of the unpurified water remains at practically its input pressure because of the orifice 75. The unpurified water flows through the module and because of plastic screen 67 it is present at each layer of the spiral. Because of the input pressure of the unpurified water, the water is diffused through the layers of the membrane sheet 60 and becomes purified or product water. The product water flows through the granular layer 65, spirally inward to tube 50 through the ports 55 into the inner part of tube 50, and exits through outlet tube 25.

Looking now to FIG. 7, an alternative embodiment of the invention is shown. The advantage of the embodiment of FIG. 7 is that all waterlines are at one end of the device to permit installation in relatively inaccessible locations. In this embodiment the housing comprises a main tube section 80 and a cap 81. The tube section 80 is made of some convenient inexpensive material, such as glass or plastic, PVC for example, and is shaped similarly to a chemical test tube, i.e., with a hemispherical end 82.

The open end 83 of tube 80 has threads 84 formed thereon. Cap 81 is internally threaded to engage with threads 84 of tube 80. The cap 81 has reduced diameter internal sections to form mounting surfaces for the tube 80 and a reverse osmosis module 87. The module 87 is similar to the module hereinabove described. Module 87 is retained in place by sleeve 88 which is supported by a reduced diameter section 89 of the cap 81. Openings 92, 93 and 94 are provided through the cap 81 for the unpurified water inlet 100, the product water outlet 101, and the unpurified water outlet 102, respectively.

The tube 101 is positively sealed to the product water output of module 87 by means of a cap 110 which is pressed fit to the module 87, and which contains therein O-ring 111 as a seal. An alternative arrangement is the use of the same module and fitting 53-25 shown in the FIG. 2 embodiment and an O-ring seal in the cap 81 similar to the groove 28 and O-ring 29 seal of the FIG. 2 embodiment. For convenience in packaging, opening 92 has a slanted portion 103 to form a path of communication between the unpurified water inlet 100 and the volume between module 87 and tube 80. Inside tube 80, proximate the end portion 82 thereof, the illustrated embodiment is provided with packing 105 which is fiber or felt or the like to serve as a filter for the incoming water. An orifice 107 is provided in the unpurified water outlet 102, to reduce the pressure as hereinabove described. The cap 81 is sealed to the end of the tube 80 by means of an O-ring 85.

Thus, in operation of the device of FIG. 7, unpurified water enters through inlet 100 and passes between tube 80 and module 87, through packing 105 and into the module 87. Some of the unpurified water diffuses through the membrane layers of the module 87, in the manner discussed hereinabove and exits as fresh product water at the outlet 101. The remaining unpurified water exhausts through the outlet 102 after having its pressure reduced by the orifice 107. The packing 105 filters large particles from the product water and helps to prevent clogging of the unpurified water passages in the module 87. An alternative arrangement is to locate the cap 81 entirely within the tube 80, or an extension thereof, similar to a plug and to utilize a snap ring arrangement as described above to hold the plug in place.

As an alternative to the device shown in FIG. 7, the tube section 80, instead of being provided with external threads, can have a flared end provided with internal threads. Such an embodiment is indicated in FIG. 8 of the drawing which shows only the flared open end 121 of a tube 120, the cutaway portion of the device being identical with that shown in FIG. 7. The enlarged end 121 is internally threaded at 122 for receptive engagement of an externally threaded cap 125. The cap 125 is provided with a series of longitudinal passageways or openings 126, 127 and 128, corresponding respectively to the openings 92, 93 and 94 in the cap 81. Into these openings are inserted the various inlet and outlet tubes 100—102 in the identical manner shown in the device of FIG. 7. The opening 126 has a slanted portion 129 to form a path of communication between the unpurified water inlet 100 and the volume between module 87 and the tube 120. As in the embodiment of FIG. 7, the module 87 is retained in place by a sleeve 88 which is supported by a reduced diameter section of the closure cap.

The threaded portion of the end 121 of tube 120 defines a shoulder 130 for seeking of O-ring 85 to effect a seal between the closure cap 125 and the tube 120. Operation of the device of FIG. 8 is identical with that of the device of FIG. 7, the primary difference being only in the construction wherein the closure cap is threaded into the tube rather than onto the tube.

We claim:

1. Water purification apparatus comprising in combination:
   a. a reverse osmosis spiral membrane module including a membrane sheet assemblage wound onto a sealed tubular casing and covering apertures in the longitudinal surface thereof for the flow of product water through said membrane and said apertures into said casing, said casing having an axially projected outlet tube at one of its ends for the removal of product water therefrom;
   b. a tubular pressure container having an end defining a central circular opening therethrough with a circumferential groove intermediate the inner and outer surfaces of the casing end, and an annular gasket of flexible resilient material disposed in said circumferential groove and extending into said circular opening around its periphery, said module being disposed within said pressure container with said outlet tube extending through said circular opening and projecting from said container with said annular gasket forming a pressure-tight seal to said outlet tube, said container further including feed water inlet means near one of its ends and feed water outlet means near its opposite end; and
   c. said tubular pressure container having an openable end formed by plug means detachably secured thereto in pressure-tight relationship whereby said module can be removed from said container upon detachment of said plug means said plug means being spaced apart from the adjacent end of said module to permit passage of water to be purified longitudinally through said module.

2. Water purification apparatus as defined in claim 1, wherein said plug means defines a cylindrical body inserted into the tubular openable end of said pressure container, the diameter of said cylindrical body being slightly less than the inner diameter of the open end of said tubular container, said cylindrical body having spaced apart circumferential grooves each having seated therein an annular gasket of flexible resilient material, these gaskets projecting circumferentially from said cylindrical body into contact with the inner wall surface of said pressure container to form a pressure-tight seal.

3. Water purification apparatus as defined in claim 2, wherein the openable end of said pressure container further defines an inner circumferential groove into which is fitted removable expansion ring means to retain said cylindrical body within said openable end of said pressure container.